United States Patent [19]

Courtaigne

[11] Patent Number: 5,775,830
[45] Date of Patent: Jul. 7, 1998

[54] WATERTIGHT CONNECTOR CASING

[75] Inventor: Bertrand Courtaigne, Paris, France

[73] Assignee: Blue Moon WW, France

[21] Appl. No.: 588,645

[22] Filed: Jan. 19, 1996

[30] Foreign Application Priority Data

Jan. 20, 1995 [FR] France .................. 95 00665

[51] Int. Cl.[6] .................................. H01R 13/52
[52] U.S. Cl. .................. 403/288; 403/321; 174/66;
277/136; 277/152; 439/273; 439/556; 439/548
[58] Field of Search ........................ 277/136, 152;
174/65 R, 66; 439/271, 272, 273, 556,
548; 403/288, 321

[56] References Cited

U.S. PATENT DOCUMENTS

| | | |
|---|---|---|
| 2,731,611 | 1/1956 | Kamm .................. 439/272 X |
| 3,594,696 | 7/1971 | Witek, Jr. . |
| 3,621,448 | 11/1971 | Arnold et al. . |
| 4,421,373 | 12/1983 | Ratchford et al. . |
| 4,707,047 | 11/1987 | Michaels et al. . |
| 4,857,007 | 8/1989 | Michaels et al. .................. 439/273 X |
| 5,295,851 | 3/1994 | Bawa et al. .................. 439/273 |
| 5,482,296 | 1/1996 | Peppiatt et al. .................. 277/136 X |

FOREIGN PATENT DOCUMENTS

| | | | |
|---|---|---|---|
| 478172 | 4/1992 | European Pat. Off. .................. 439/271 |
| 1004734 | 3/1957 | Germany .................. 439/273 |
| 801224 | 9/1958 | United Kingdom .................. 439/271 |
| 2128036 | 4/1984 | United Kingdom . |

Primary Examiner—Anthony Knight
Attorney, Agent, or Firm—William A. Drucker

[57] ABSTRACT

Disclosed is a connector casing made watertight by the addition of a seal. It is made up of a first casing element (1) mating with a second casing element (2). The first casing element is designed with a hook (3) which retains a stop (4) integral with the casing element (2) which is equipped with a lip seal (5) of asymmetrical section and prevented from rotating by an indexing lug (6). The front of the casing element (1) has a change of level (6) which partially embeds the lip seal.

6 Claims, 1 Drawing Sheet

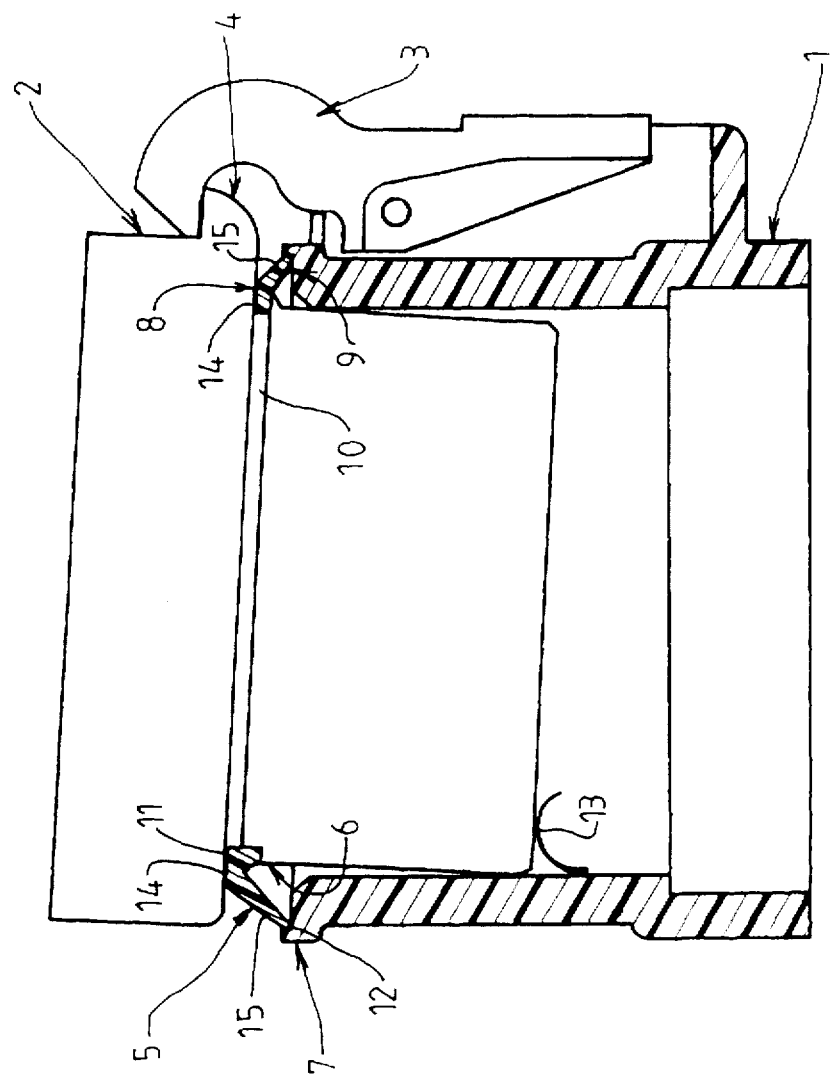

WATERTIGHT CONNECTOR CASING

BACKGROUND OF THE INVENTION

1. Field of the Invention

The present invention relates to a connector casing equipped with a new sealing device.

2. Description of the Prior art

Prior-art electrical connector casings usually consist of a receptacle portion and a plug portion which are sometimes made watertight by the addition of a flat elastic seal designed to be crushed and which operates poorly when said connector casings are not provided with clamping means such as a bayonet, a nut, or any other mechanical means.

This lack of tightness is particularly evident in connectors not designed with clamping means and in which the retention of one casing element in the other is provided by a device such as a stop in a cover or a hook on one of the casing elements and a hooking element such as a lug or a diameter change in the other casing element.

This type of casing frequently engages in two movements. The first movement brings the two casing elements towards each other and allows the passage of the lug or diameter change of one of the casing elements beyond the useful fastening point such as the cover stop or the hook integral with the other casing element.

The second movement consists in a limited withdrawal which, by simple gravity or under the action of a spring, separates the two casing elements in a possibly asymmetrical manner until the retaining device operates and the hook or cover stop comes into contact with the lug in the opposite casing and secures it.

A separating space is thus left at the end of the second movement between the two casing element faces able to receive a seal, said separating space being capable of having a triangular section or rather trapezoidal section difficult to fill in a watertight manner.

This separating space is particularly evident in connector casings designed with an ejection spring allowing fast separation of the two casing elements by the release of one of the two casing elements due to the raising of the cover and of the hook integral with the other casing element.

OBJECT OF THE INVENTION

It is an object of the present invention to solve this problem of tightness.

SUMMARY OF THE INVENTION

The invention consists in providing on one of the casing elements an advantageously circular seal, for example in elastomer or any other material having similar elastic properties with at least one lip whose length enables it to deform on the sealing face of the opposite casing element at the end of the first mating movement and to return during the second withdrawal movement to its original form while remaining applied on the sealing face.

Advantageously, this seal may have a shape which is unequal over its circumference such as an offcentering giving a shorter lip on one side of its circumference and a longer one on the other, allowing adaptation to the possible trapezoidal section of the separating space between the casings in the final mating phase.

In a particular embodiment of the invention the seal face may be provided with a peripheral edge projecting axially and having a diameter advantageously equal to or greater than the maximum lip seal flattening diameter, so as to delimit a volume receiving the lip seal edge, and which will act as a jet breaker and will prevent the lip seal against the risk of lifting due to direct exposure to a strong water jet.

BRIEF DESCRIPTION OF THE DRAWINGS

The single FIGURE is a sectional representation of the connector casing according to the invention.

DESCRIPTION OF THE PREFERRED EMBODIMENT

Referring to this FIGURE, the connector casing has a first casing element I mating with a second casing element 2, the mating action of which involves an insertion movement and then a limited withdrawal movement. Such a withdrawal movement may be induced by an ejection spring 13 disposed between the two casing elements 1,2, or under the effect of gravity.

The two casing elements 1,2 are for example substantially cylindrical.

The first casing element I is designed with a hook 3 which retains a stop 4 integral with the other casing element 2, so that after the withdrawal movement, both of the casing elements 1,2 are not coaxial and have annular sealing faces 8,9 delimiting therebetween a separating space having a substantially trapezoidal section.

In order to provide a watertight connector casing, the casing element 2 has a peripheral groove 10 for receiving an annular elastic lip seal 5. This seal comprises an annular base 14 having two opposite radial faces, one of said radial faces bearing on a sealing face 8 provided by the casing element 2 and extending laterally from the groove 10, while a substantially conical lip 15 extends from the external edge of the other radial face of the base 14.

Due to the irregular shape of the separating space between the casing elements after the withdrawal movement, the lip 15 of the seal 5 has an asymmetrical axial section. More particularly, the lip 15 is axially flared out ending in a slantwise plane with respect to the radial plane including the base 14.

Advantageously, the seal 5 is oriented and prevented from rotating by an indexing lug 6 cooperating with a corresponding shape formed in the groove 10.

During the insertion movement, the lip 15 is compressed between the sealing face 8 and the annular sealing face 9 provided on the casing element 1, and bears on the sealing face 9 after the withdrawal movement.

Advantageously, the sealing face 9 of the casing element I has a peripheral edge 7 which projects axially and defines a volume receiving the circular edge 12 of the seal 5, this peripheral edge 7 having a diameter equal to or greater than the maximum seal expansion diameter.

I claim:

1. Watertight connector casing comprising a first and a second casing element designed to mate with a radial looseness between them, and having a respective peripheral location provided respectively with clamping means cooperating with each other for retaining said two casing elements in a mating position at said peripheral locations, the mating action of said two casing elements involving an insertion movement and then a limited substantially pivoting withdrawal movement due to a combined action of said cooperating clamping means and of said radial looseness, said two casing elements having two respective facing plane sealing surfaces, at least said first casing element being provided with an elastic seal having at least one lip which is deformed between said two sealing surfaces at the end of said insertion movement while remaining applied against said two sealing surfaces after said pivoting withdrawal movement.

2. The connector casing as defined in claim 1, wherein said two facing sealing surfaces are annular and delimit therebetween, after said pivoting withdrawal movement, a separating space having a substantially trapezoidal section, and the length of the lip of said seal progressively increases from said peripheral location to an opposite peripheral location of said two casing elements, so that the edges of said lip respectively bear on said two sealing surfaces after said pivoting withdrawal movement.

3. The connector casing as defined in claim 1, wherein said seal has an irregular form and indexing means in conjunction with corresponding means provided on said first casing element so as to orient said seal and prevent it from rotating and index it in relation to its irregular form.

4. The connector casing as defined in claim 1, wherein said lip has a substantially conical shape extending outwardly with respect to said first casing element and has a maximum expansion diameter, and the sealing surface of said second casing element has a peripheral edge projecting axially and having a diameter equal to or greater than said maximum lip expansion diameter, said peripheral edge defining a volume receiving the circular edge of said lip bearing on said second casing element.

5. The connector casing as defined in claim 1, wherein one of said casing elements is provided with an ejection spring.

6. Watertight connector casing comprising a first and a second casing element designed to mate with a radial looseness between them, and having a respective peripheral location provided respectively with clamping means cooperating with each other for retaining said two casing elements in a mating position at said peripheral locations, the mating action of said two casing elements involving an insertion movement and then a limited substantially pivoting withdrawal movement due to a combined action of said cooperating clamping means and of said radial looseness, said two casing elements delimiting after said pivoting withdrawal movement a separating space having a substantially trapezoidal section, said two casing elements having two respective facing plane sealing surfaces, at least said first casing element being provided with an elastic seal having at least one lip whose length progressively increases from said peripheral location to an opposite peripheral location of said two casing elements, so that said lip is deformed between said two sealing surfaces at the end of said insertion movement while its edges remain applied against said two sealing surfaces after said pivoting withdrawal movement.

\* \* \* \* \*